United States Patent
Zaragoza Labes et al.

(10) Patent No.: US 10,557,579 B2
(45) Date of Patent: Feb. 11, 2020

(54) JOINT MADE OF SHAPE MEMORY ALLOY AND USES THEREOF

(71) Applicant: FMC TECHNOLOGIES DO BRASIL LTDA, Rio de Janeiro (BR)

(72) Inventors: Alan Zaragoza Labes, Rio de Janeiro (BR); Ana Maria Guimarães Guerreiro, Rio de Janeiro (BR); Thiago Simões Castanheira Francis Chehuan, Rio de Janeiro (BR); Raquel Silveira Borges, Rio de Janeiro (BR); Sandro Eugenio Da Silva, Rio de Janeiro (BR)

(73) Assignee: FMC TECHNOLOGIES DO BRASIL LTDA, Rio de Janeiro (BR)

( * ) Notice: Subject to any disclaimer, the term of this patent is extended or adjusted under 35 U.S.C. 154(b) by 139 days.

(21) Appl. No.: 15/569,892

(22) PCT Filed: Apr. 27, 2015

(86) PCT No.: PCT/BR2015/050049
§ 371 (c)(1),
(2) Date: Oct. 27, 2017

(87) PCT Pub. No.: WO2016/172772
PCT Pub. Date: Nov. 3, 2016

(65) Prior Publication Data
US 2018/0119856 A1    May 3, 2018

(51) Int. Cl.
*F16L 25/02*  (2006.01)
*C22C 19/05*  (2006.01)
*E21B 34/04*  (2006.01)

(52) U.S. Cl.
CPC ............ *F16L 25/02* (2013.01); *C22C 19/051* (2013.01); *E21B 34/04* (2013.01)

(58) Field of Classification Search
CPC ............................... F16L 13/004; F16L 25/02
(Continued)

(56) References Cited

U.S. PATENT DOCUMENTS

| | | | | |
|---|---|---|---|---|
| 3,477,750 A | * | 11/1969 | Powell | F16L 13/142 285/363 |
| 4,092,193 A | * | 5/1978 | Brooks | F16L 13/004 156/83 |

(Continued)

FOREIGN PATENT DOCUMENTS

| | | |
|---|---|---|
| EP | 0632224 B1 | 11/1998 |
| GB | 1518788 A * | 7/1978 ............ F16L 13/004 |

(Continued)

OTHER PUBLICATIONS

International Search Report issued in PCT/BR2015/050049 dated Jan. 8, 2016 (3 pages).
(Continued)

*Primary Examiner* — David Bochna
(74) *Attorney, Agent, or Firm* — Osha Liang LLP

(57) ABSTRACT

The present application refers to a connection for connecting hydraulic tubing as used by subsea devices, by using a shaped memory alloy material. The sleeve connection made of a shaped memory alloy material is originally manufactured with an internal diameter shorter than the external diameter of the tubing, internally has a cover material made of dielectric material and, most internally, has a layer of an anti-corrosive material which is contiguous to the external face of said tubing The layer of an anti-corrosive material internally has protruding portions designed to grasp the external surface of the tubing, forming streaks.

10 Claims, 2 Drawing Sheets

(58) Field of Classification Search
USPC .......................................... 285/381.2, 382.3
See application file for complete search history.

(56) References Cited

U.S. PATENT DOCUMENTS

| | | | | | |
|---|---|---|---|---|---|
| 4,135,743 | A * | 1/1979 | Hughes | ............... | F16L 13/004 174/DIG. 8 |
| 4,198,081 | A * | 4/1980 | Harrison | ............... | F16L 13/004 148/402 |
| 4,226,448 | A * | 10/1980 | Broyles | ............... | F16L 13/004 285/381.2 |
| 4,283,079 | A * | 8/1981 | Flaherty | ............... | F16L 13/004 285/381.2 |
| 4,379,575 | A * | 4/1983 | Martin | ............... | F16L 13/004 285/369 |
| 4,469,357 | A * | 9/1984 | Martin | ............... | F16L 13/004 285/381.3 |
| 4,832,382 | A * | 5/1989 | Kapgan | ............... | F16L 13/004 174/DIG. 8 |
| 4,872,713 | A * | 10/1989 | Kapgan | ............... | F16L 13/004 285/381.3 |
| 5,150,931 | A * | 9/1992 | Hagio | ............... | F16L 13/004 285/381.3 |
| 5,174,616 | A * | 12/1992 | Hagio | ............... | F16L 13/004 228/56.3 |
| 5,265,919 | A | 11/1993 | Takemoto et al. | | |
| 5,338,070 | A * | 8/1994 | Horikawa | ............. | F16L 13/004 285/148.23 |
| 5,662,362 | A * | 9/1997 | Kapgan | ............... | F16L 13/004 285/381.1 |

FOREIGN PATENT DOCUMENTS

| | | |
|---|---|---|
| JP | H03-189494 A | 8/1991 |
| JP | H04-272593 A | 9/1992 |
| JP | 2004-324677 A | 11/2004 |

OTHER PUBLICATIONS

Written Opinion of the International Searching Authority issued in PCT/BR2015/050049 dated Jan. 8, 2016 (3 pages).

* cited by examiner

JOINT MADE OF SHAPE MEMORY ALLOY AND USES THEREOF

This application claims priority to PCT Application No. PCT/BR2015/050049 filed on Apr. 27, 2015, which is incorporated by reference in its entirety.

FIELD OF THE INVENTION

The present invention refers to a connection for hydraulic tubing, using a shaped memory alloy material, notably used for subsea devices.

BACKGROUND OF THE INVENTION

SMA (Shaped Memory Alloy) is an alloy which, when deformed, returns to its original shape if heated, "remembering" its original form. When the shaped memory alloy is in its cold state, the metal may be folded or stretched in various shapes, which will be maintained until it is heated above the transition temperature. After heating, the shape changes, returning to the original. Said alloy has been used as a connection for tubes for coupling or junction in subsea environments, substituting the orbital welding process which is commonly used.

The shaped memory effect in nickel-titanium alloys was disclosed for the first time by *Naval Ordenance Laboratory*, in 1962. In 1963, a coupling for 6000 psi pressure was projected and qualified for surface vessels of the Royal Navy. In 1969, an application was disclosed for 3000 psi pressure coupling, appropriate for a fighter jet F14 from the U. S. Navy. In 1975, the system was extended for nuclear submarines of the Trafalgar class. Nowadays, couplings based on shaped memory alloy are used by companies in the aerospace industry in airplanes (Boeing®, Airbus®, Cessna®, Learjet®, Bell® Helicopters and many others), and in the tubing, automotive, telecommunication, robotic, medical and motor industries.

Subsea Christmas trees are used in oil and gas fields. A subsea Christmas tree monitors and controls the production of a well, managing fluids and gases as injected into the well. Subsea Christmas trees have various tube connectors, requiring connections to be sufficiently efficient to avoid leakage. In production lines, the orbital welding process is frequently used for the connection of hydraulic tubes, but there are a few problems during this process, including e.g. a special preparation of the tubes, use of specific machines to be employed for orbital welding, qualified staff, a complex welding procedure, post-welding preparation, visual inspection of X rays including the whole preparation process, a wide workspace and a huge time to perform the operation, among others.

Therefore, considering that the orbital welding process represents about 50% of the hydraulic instrument schedule to assembly a Christmas tree and considering workflows which are usually very crowded, solutions involving better use of time and less cost should be especially preferred.

Therefore, despite subsea tube orbital welding still being currently used, the shaped memory alloy represents a new solution for submerse tube coupling, since, besides reducing the problems as indicated above, it provides advantages such as:

- the tension of the connection is not affected by vibrations or impacts;
- the assembling time is insignificant in comparison with orbital welding, since it requires just a few minutes;
- increase in work safety;
- work with X ray inspection is dismissed;
- no requirement of highly qualified staff;
- no requirement of constant training for technical staff for qualification for the service; and
- reduction of about ⅓ in the total cost of the operation.

The patent EP 0632224B1 presents a solution for subsea couplings or connections embodied by means of a configuration comprising an anti-corrosive material around the tube, followed by the memory alloy covered by the same material of the tube, to avoid galvanic corrosion and weakening by hydrogen. That solution, despite using shaped memory alloy, has an inconvenience related to the requirement to perform material deposition over the shaped memory alloy, and that material should mandatorily have the same composition of the tube, since, if different, galvanic corrosion will occur and any fault in deposition will make the material susceptible to corrosion. Furthermore, special attention should be given to the thickness of the deposition of the shaped memory alloy material, to avoid the flexibility of movement of the relaxing material and its contraction from being compromised, which would damage the connection.

Therefore, so to definitely solve all the problems as indicated above, a connection using shaped memory alloy material of the present invention has been developed, which is used in subsea Christmas trees or any other subsea devices requiring tube coupling, even in the presence of corrosive water and a wide range of hydraulic fluids and chemicals, both in the internal and external environment of the tubes.

BRIEF DESCRIPTION OF THE INVENTION

Therefore, an object of the invention is to provide a connection made of a shaped memory alloy material so to minimize all the inconveniences as mentioned above, besides providing for reduction in costs, assembly time and maintenance.

Another object of the invention is to provide a connection with a memory alloy material which is especially appropriate for use in coupling subsea device tubes, which require better safety concerning the firmness of coupling and sealing leak-tightness, besides being applied under adverse conditions concerning the embodiment of the coupling itself, as well as care to be taken on the corrosive effects of those environments wherein tubes work and the fluids they transport.

Another object of the invention is to provide a connection with a shaped memory alloy material which is resistant against weakening by hydrogen.

An additional object of the invention is to provide a connection with a shaped memory alloy material which may be covered by a metal material which is more resistant against corrosion, depending on the application and work environment.

Furthermore, another object of the invention is to provide a connection with a shaped memory alloy material so to avoid weakening by hydrogen, since it is isolated from the cathodic protection, e.g. a dielectric material between the anti-corrosive material and the memory alloy material.

BRIEF DESCRIPTION OF THE DRAWINGS

The connection object of the invention, as well as its preferred way of embodiment, will be disclosed below with reference to the attached illustrative drawings, which represent, in a schematic and non-limitative form of its scope.

DETAILED DESCRIPTION OF THE INVENTION

Figure 1:
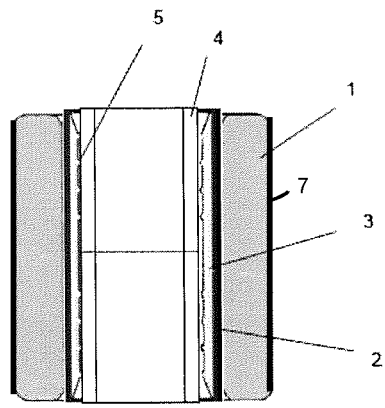
FIG. 1: lengthwise cut view of the connection as coupled to the tubing of the invention.
Figure 2:
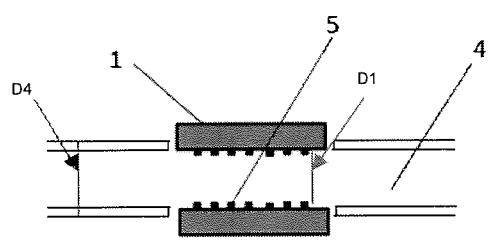
FIG. 2: view of the connection showing its internal diameter shorter than the external diameter of the tubing.
Figure 3:
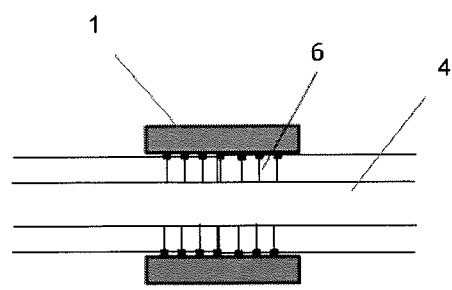
FIG. 3: view of the connection and respective tubing showing the expanded state.

Therefore, according to the above mentioned drawings, we can observe that, in subsea tubing (4), a sleeve connection of a shaped memory alloy material (1) is provided, originally manufactured with its internal diameter (D1) shorter than the external diameter (D4) of said tubing (4). Said sleeve connection made of a shaped memory alloy material (1) internally has a covering material made of a dielectric material (2) and, more internally, a sleeve or layer (3) of an anti-corrosive material, e.g. Inconel®, which is a nickel-chrome material with the addition of molybdenum and niobium. Said layer (3) made of an anti-corrosive material is installed next to the external face of said tubing (4) and internally has protruding portions (5) designed to grasp the external surface of the tubing (4), forming streaks (6).

The dielectric material layer (2) avoids the coupling to be related to cathodic protection. Therefore, the connection of the invention will not be damaged for being weakened by hydrogen. Under that configuration, the connection of a shaped memory alloy material (1) of the invention will not need to be covered or layered by any kind of corrosion resistant material, since there will be no problem related to the contact with seawater. It is also important to remark that the dielectric material layer (2) should have appropriate thickness, just to avoid rupture problems for the connection by mechanical efforts over the tube. Typically, the thickness of the dielectric material layer (3) may vary between 0.05 and 1.00 mm. Furthermore, in a few applications, covering, schematically represented at (7), may be applied over the connection made of shaped memory material (1) to provide protection to the connection against a possible unforeseen increase in potential (voltage), e.g. caused by the deposition of bacteria, creating a biofilm layer. Typical coverings for that additional protection are those based on polyolefin or similar.

Figure 4:
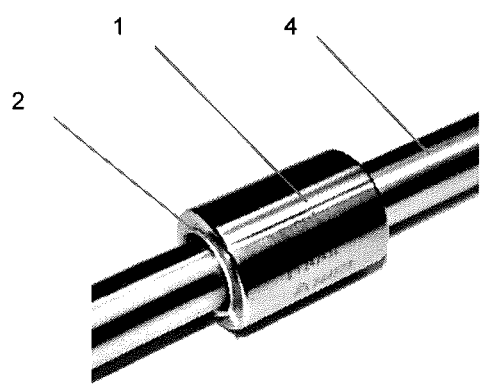
FIG. 4: perspective view of a connection and respective tubing assembled according to an embodiment of the invention.

FIG. 4 shows a connection made of a shaped memory alloy material (1) and tubing (4) assembled according to an embodiment of the invention and upon return to the normal working temperature, following the return to its original shape and the consequent compression over the tubing (4).

It should also be highlighted that the working temperature for the connection of the invention will depend on the kind of isolating material. For example, if the material is Nomex®, a connection is qualified to work at a temperature between about 0° C. and 60° C. for 25 years under subsea environment.

EXAMPLES OF EMBODIMENTS, TESTS AND ASSAYS OF THE INVENTION

The connection for hydraulic tubing used in subsea devices by employing shaped memory alloy material of the invention, hereinafter indicated just as connection, has been submitted to various tests, such as gas sealing, pneumatics, hydrostatic explosion, hyberbaric, rotation and flexure, tension, high impact, thermal cycle and high temperature, being efficient and qualifying for application in the control of hydraulic lines of subsea equipment.

In the laboratories of the Federal University of Rio de Janeiro—Brazil (PEMM/DMM-COPPE-EP-UFRJ), ageing tests with the connection of the invention have been performed, which was submitted to 3200 psi pressure, in a 3.5% NaCl solution and under temperatures between 140° C. and 160° C. The results of such tests have shown the ability of the dielectric material not to lose its isolating properties.

Continuity Test:

Before the samples are put in the autoclave for the ageing tests, a continuity test has been performed with a multitester so to verify the lack of contact between the tube and the connection.

In this test, the same behavior has been noticed for all samples, confirming a resistance of about 0.3Ω when the device contact has only been made on the edges of the tube and extremely high resistance (overloading the device) when the contact is performed on the connection and the tube.

Ageing Test:

The present test has consisted in immersing the tubes with the connection in a 3.5% NaCl solution under two different temperatures, 140° C. and 160° C., and total pressure of 3200 psi. Firstly, the tubes have been put inside an autoclave with capacity for 8 liters of solution. A piece of loose paper Nomex®, the same as used to isolate the tube connection, has also been included.

The autoclave was then filled in with the test solution.

Autoclaves were closed, heated up to the test temperature (140° C. and 160° C.) and pressurized until 3200 psi with $N_2$. The test lasted 15 days and, after that time, samples have been taken from autoclaves for evaluation.

We could verify that the Nomex® paper in the 140° C. test was not degraded, but the paper fully degraded in the 160° C. tests. The connection had one darker half than the other for the 140° C. test, but no deterioration of the Nomex® paper between the connection and the tube has been noticed. At 160° C., despite the Nomex® paper which was loose in the autoclave has been degraded, no contact between the connection and the tube was verified. This has been proven by measuring continuity with the multitester, which showed very low resistance of about 0.6Ω when the contact with the device was only made by the edges of the tube, and extremely high resistance (overloading the device) when the contact was made by the connection and the tube, showing that there was no contact between the connection and the tube, i.e. they were isolated.

Cathodic Protection Test:

The cathodic protection test consisted of a cathodic polarization of the connection+tube sets at $-1.4V_{ECS}$ after being taken from the ageing test, with the object to prove the lack of hydrogen bubbles over the connection. The test has been performed by using a 3.5% NaCl solution and a potentiostat trademark IVIUM® to apply the desired tension. A graphite electrode has been used as a counter electrode, and a saturated calomel electrode, as a reference electrode.

Hydrogen bubbles were noticed just leaving the tube in that test. At the end of four days, the form sets were taken from the solution and the continuity test was again performed with the multimeter. Again, very low resistance of about 0.4Ω was shown when the contact with the device was only made by the edges of the tube, with extremely high resistance (overloading the device) when the contact was made by the connection and the tube, showing that there was no contact between the connection and the tube, i.e. they were isolated.

Therefore, as the skilled man in the art may appreciate, the use and application of that new connection for hydraulic tubing in subsea devices, object of the invention, provides coupling of the memory tube in a way which is resistant against weakening by hydrogen and corrosion. Furthermore, substantial reduction of costs and complexity of embodiment, operation, assembly, maintenance, time and logistics is reached, besides providing better reliability for said connection of a shaped memory alloy material in tubing systems of subsea devices.

The invention claimed is:

1. A connection of a memory alloy material comprising a sleeve connection made of a shaped memory alloy material, originally manufactured with an internal diameter shorter than an external diameter of a tubing, internally having a cover material made of dielectric material and, most internally, a layer of an anti-corrosive material which is contiguous to an external face of said tubing, said layer of an anti-corrosive material internally having protruding portions designed to grasp an external surface of the tubing, forming streaks, and said anti-corrosive material comprising a nickel-chrome material having added molybdenum and niobium.

2. The connection of claim 1, wherein the internal cover of dielectric material comprises paper material for electric isolation or a compound based on ceramic covering.

3. The connection of claim 1, wherein a thickness of the dielectric material layer is within a range between 0.05 and 1.00 mm.

4. The connection of claim 1, wherein said connection of a shaped memory material is covered by a protection material against potential (voltage) increases.

5. The connection of claim 4, wherein the covering is composed of polyolefin.

6. A method of using the connection of claim 1 in subsea Christmas trees or any other subsea devices requiring coupling between tubes.

7. The method of claim 6, wherein corrosive water and hydraulic fluids and chemicals are present both in the internal and external environment of said tubing.

8. A connection of a memory alloy material comprising:
a sleeve connection made of a shaped memory alloy material, originally manufactured with an internal diameter shorter than an external diameter of a tubing;
an internal cover material made of dielectric material;
a layer of an anti-corrosive material, internal to the internal cover material, which is contiguous to an external face of said tubing, said layer of an anti-corrosive material internally having protruding portions designed to grasp an external surface of the tubing, forming streaks; and
a covering of a protection material against potential (voltage) increases covering the connection of the shaped memory alloy material.

9. The connection of claim 8, wherein the covering is composed of polyolefin.

10. A connection of memory alloy material comprising:
a sleeve connection made of a shaped memory alloy material, originally manufactured with an internal diameter shorter than an external diameter of a tubing;
an internal cover made of dielectric material, wherein the dielectric material comprises paper material for electric isolation; and
a layer of an anti-corrosive material, internal to the internal cover material, which is contiguous to an external face of said tubing, said layer of an anti-corrosive material internally having protruding portions designed to grasp an external surface of the tubing, forming streaks.

* * * * *